Oct. 1, 1963   E. K. SCHULTZ, JR   3,105,567
BATTERY AND CLAMP PROTECTOR
Original Filed March 11, 1959

INVENTOR.
EARL K. SCHULTZ, JR.
BY *Hiram A. Sturges*
       *agent*

United States Patent Office 3,105,567
Patented Oct. 1, 1963

3,105,567
BATTERY AND CLAMP PROTECTOR
Earl K. Schultz, Jr., 5513 Harney St., Omaha, Nebr.
Continuation of application Ser. No. 798,641, Mar. 11,
1959. This application Sept. 16, 1960, Ser. No. 56,530
2 Claims. (Cl. 180—68.5)

This invention relates to storage batteries particularly of the type used in motor vehicles, and in particular a spacer or frame of plastic, such as polyethylene, substantially Z-shaped in cross section, having a rectangular-shaped base plate with a continuous depending outer flange on the outer edge, and a similar upwardly disposed inner flange on the inner edge, whereby with the frame positioned around the upper edge of a battery and between hold-down clamps and the upper surface of the battery the hold-down clamps are spaced from the battery and the possibility of short circuiting due to corrosion resulting from water and electrolyte on the upper surface of the battery is obviated.

The purpose of this invention is to space the hold-down clamp for securing a battery in position on a platform, particularly of a motor vehicle, so that water, electrolyte, and the like, accumulating on the upper surface of a battery is not retained in contact with the clamp, and corrosion is reduced to a minimum.

Various types of metal hold-down clamps and frames have been provided for use on motor vehicle batteries, however, such devices fit snugly over the batteries and moisture accumulating on the battery is retained between the battery and clamp resulting in corrosion, and eventually shorting between the terminals of the battery. With this thought in mind, this invention contemplates a spacing frame of plastic, such as polyethylene, or other electrically insulating material including waterproof fibers, or plastic coated fibers, or plastics employing various fillers, positioned on the upper end of a battery and between a hold-down clamp and a battery so that corrosion between the clamp and battery is eliminated, the material of the spacing frame being such that it will hold its shape under normal use conditions.

I am aware that battery hold-down clamps have been placed on the market which have been coated with various materials such such as rubber, plastic or other corrosion resistant material whereby the battery clamp is protected from corrosion by battery acid. However, these products have not had wide sale nor have they solved the problem because a coated object does not have long service life, being generally subject to the chipping away of the coating which exposes the metal to the concentrated corrosion of the battery acid.

Another reason why coated battery clamps have not solved the problem is because of their high cost. When a car owner throws away his existing battery hold-down clamp in order to substitute a coated clamp, the original clamp has a value that is completely lost. It is therefore the object of my invention to provide a clamp protector which can be used with existing clamps at low cost and to avoid the waste above described.

While a separate clamp protector device has a slightly greater cost than a dipped coated clamp, nevertheless I have conceived that the first cost is unimportant compared with the much longer life I achieve by protecting the exposed threaded portions of the rod, the washers, and the nut of the clamp from corrosion.

When a coated clamp is used, it is not possible to coat the threaded end of the rod, nor the washers or nuts, for otherwise the washers and nuts could not be put in place. Consequently, this clamp has its limitations and the dip coating leaves those parts exposed to speedy corrosion.

A particular object of my invention is to provide an upwardly disposed flange extending around the opening necessary for access to the cell-caps and terminal posts. This upstanding flange prevents the splashing of battery acid across the battery as will quickly reach these exposed threaded rod areas, nuts, and washers.

Such splashing commonly occurs at the time when water is being added to the battery, as when the added water strikes the acid battery liquid.

There is a further problem in that the salts from the interior of the battery, tend to grow, starting in the area where the splash has occurred, with the crystals forming as soon as the liquid has dried, the crystals tending to grow and creep across the upper surface of the battery in the direction of those metal areas which are exposed to corrosion. This is a common problem and the creeping toward corrodible areas allows electrical conduction which itself is a factor further corroding the corrodible parts as well as tending to dissipate battery energy—in extreme cases completely dissipating battery energy.

I am aware that certain attempts have been made to provide housings for the threaded rod and nut areas, but these have not met with wide acceptance because of the prohibitive costs thereof.

A further object of my invention is to provide a clamp protector having a base plate portion which is adapted to cover and protect a substantial area of the upper surface of the battery, in particular the area that is near the battery clamp.

A further object is to provide my battery clamp with a dependent flange which serves the dual purpose of further protecting the metal battery clamp from horizontally moving corrosion liquid, and also the downwardly depending flange portions extend down a considerable distance past the battery clamp in order to prevent liquid that has passed over the edge of the battery and down to the lower end of my depending flange from climbing up the outside of the flange and reaching the battery clamp rails or the threaded ends of the clamp rods.

A realistic solution to the battery clamp corosion problem must include consideration of the effect of the hydrogen and oxygen gases which are continually escaping from the battery up through the holes in the cell-caps. As these gases move upwardly during operation of the vehicle, they physically carry with them certain amounts of battery liquid which then escapes out onto the upper surface of the battery and blows with air currents against the exposed threaded portions of the clamp rod corroding the same.

My solution to this problem involves the provision of a barrier wall or flange upstanding from the upper surface of the battery a sufficient distance to block the wind currents or air currents that carry the hydrogen and oxygen gases over to the exposed threaded post areas thus preventing the acid that is physically carried with the movement of these gases from reaching and corroding the vulnerable exposed metal threaded post area.

This application is a continuation of applicant's copending application, Serial No. 798,641, filed March 11, 1959, entitled, Battery and Clamp Protector, and now abandoned.

Other features and advantages of the invention will appear from the following description taken in connection with the drawings, wherein.

Figure 1:
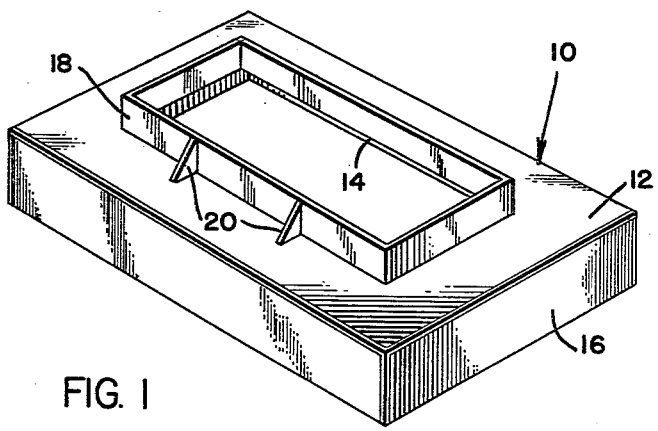
FIGURE 1 is a perspective view illustrating a frame of plastic or the like designed to be positioned on the upper edge of a motor vehicle battery and between the battery and a holddown clamp therefor.
Figure 2:
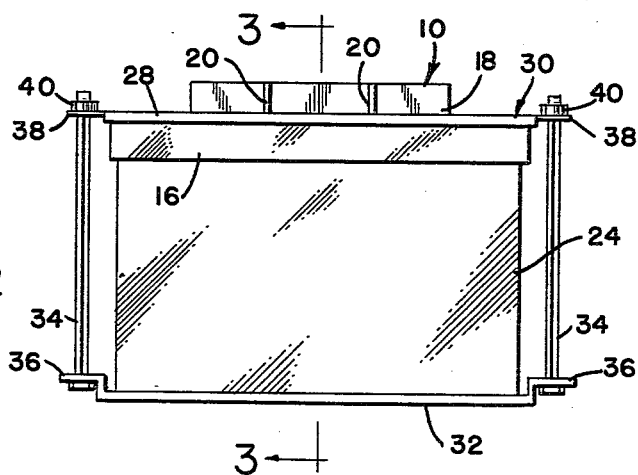
FIGURE 2 is a side elevational view of a battery, such as a motor vehicle battery, showing a plastic frame between the upper edge of the battery and a hold-down clamp therefor.
Figure 3:
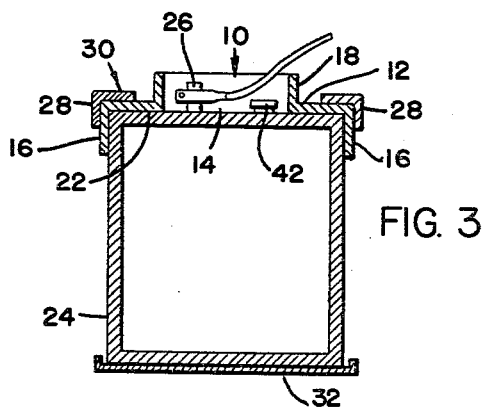
FIGURE 3 is a cross section through the battery assembly shown in FIGURE 2, taken on line 3—3 of said figure.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirely, numeral 12 indicating a rectangular-shaped plate, or annular base plate 12, having a rectangular-shaped opening 14 in the intermediate part, numeral 16 indicating an outer depending flange extended continuously from the outer edge of the plate, and numeral 18 a continuous inner upwardly disposed flange extended from the inner edge of the plate.

The inner upwardly disposed flange 18 may be reinforced by diagonally positioned braces 20, if desired.

In use the frame or spacer is positioned on the upper edge 22 of a battery 24 with the terminals 26 of the battery in the opening 14, and the rails 28 of a hold-down clamp 30 are position on the upper corner of the spacer or frame. The hold-down frame is clamped in position on a platform 32 by bolts 34 which extend from ears 36 of the platform through ears 38 of the hold-down frame, and the upper ends of which are provided with nuts 40.

By this means and with the spacer or frame 10 made of plastic or other electrically insulating material, such as polyethylene, a battery is clamped in position upon a platform or the like, with a hold-down frame or clamp spaced from the material of the battery so that corrosion between the hold-down frame and battery is obviated, and conduction between the terminals is substantially eliminated. The opening in the spacer or plastic frame provides access to the battery terminals, and also to the filling ports 42 of the battery, one of which is illustrated at 42.

It will be seen that the opening 14 is for the purpose of receiving therein battery terminal means and filler port assembly means such as seen at 26 and 42 respectively.

The base plate 12 has a substantially horizontal lower surface for engaging the horizontal top of the battery 24, such horizontal lower surface completely surrounding the opening 14 and being entirely of a substantially uniform width and of a sufficient width as seen in top plan view as measured from a point on any of its opening side walls to the closest point on the outside thereof to substantially block the flow of acid from said terminal means 26 and said filler port assembly means 42 to the sides of the battery.

All portions of the base plate 12 surrounding the opening 14 have a one-piece construction to prevent leakage therethrough and also have a vertical thickness sufficiently great as to form a barrier to prevent substantially quantities of airborne battery acid from reaching the corrodible hold-down clamp portions on the outer side of the barrier so formed.

The feature of having the spacer and protector on this invention formed substantially completely of an electrically insulating and battery acid resistant material provides a durable protection of low cost.

From the foregoing specification it will become apparent that the invention disclosed will adequately accomplish the functions for which it has been designed and in an economical manner and that is simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice if desired.

I claim:

1. An insulating spacer and protector adapted to be placed between a motor vehicle battery and a conventional battery hold down device having portions normally extending around upper outer edges of the battery, said spacer comprising: a horizontally disposed base plate formed of plastic for corrosion resistance and having an opening extending vertically therethrough and having an upwardly disposed flange extended around the opening and a depending flange extended around the outer edge, the frame being designed to be positioned on the upper edge of a motor vehicle battery, and said base plate over-lapping the outer portion of the top of the battery and extended continuously around the battery, said spacer being disposable against said battery and between said portions of said conventional hold down device and said battery, said upwardly disposed flange being of substantial height for serving as a barrier to prevent splashed battery acid coming from the area inside said opening from reaching the hold down clamp portions on the outer side of said upwardly disposed flange.

2. An insulating spacer and protector adapted to be placed between a motor vehicle battery and a conventional battery hold down device having portions normally extending around upper outer edges of the battery, said spacer comprising: barrier means disposable between each side of the top of a battery and the battery terminals thereof, said barrier means being of a substantial height and of a sufficient size to prevent substantial quantities of splashed battery acid coming from the battery terminal area from reaching the sides of the top of the battery where corrodible hold down clamp portions are located, and base means attached to said barrier means and extending outwardly therefrom in use substantially to the side edges of a battery and being of a size such that said base means can be compressed under those portions of a conventional battery hold down assembly which engage the corners of a battery at the top and sides, said base means being flat along a sufficient portion of its undersurface so as to engage the top of a battery to block a flow of acid from said terminals directly to the said each side of said battery and said base means being of substantial size for this purpose, and downwardly depending flange means attached to said base means and disposed in use extending down the sides of the battery sufficiently to help hold said base and barrier means in place, said spacer and protector being formed of electrically insulating and battery acid corrosion resistant material.

References Cited in the file of this patent

UNITED STATES PATENTS

| | | |
|---|---|---|
| 1,424,144 | Kunkel | July 25, 1922 |
| 2,094,329 | Mascuch | Sept. 28, 1937 |
| 2,181,304 | Lord | Nov. 28, 1939 |
| 2,491,997 | Meyer | Dec. 20, 1949 |
| 2,849,074 | Key et al. | Aug. 26, 1958 |
| 2,956,101 | Buhl | Oct. 11, 1960 |